(12) United States Patent
Genani (10) Patent No.: US 10,071,476 B2
(45) Date of Patent: Sep. 11, 2018

(54) DEVICE WITH IMPROVED ACTUATING MEANS AND METHOD FOR USE THEREOF

(71) Applicant: Skel-Ex Holding B.V., Rotterdam (NL)

(72) Inventor: Gaurav Genani, Rotterdam (NL)

(73) Assignee: SKEL-EX HOLDING B.V., Rotterdam (NL)

( * ) Notice: Subject to any disclaimer, the term of this patent is extended or adjusted under 35 U.S.C. 154(b) by 167 days.

(21) Appl. No.: 14/966,778

(22) Filed: Dec. 11, 2015

(65) Prior Publication Data

US 2016/0096268 A1 Apr. 7, 2016

Related U.S. Application Data

(63) Continuation of application No. PCT/CN2014/050380, filed on Jun. 11, 2014.

(30) Foreign Application Priority Data

Jun. 12, 2013 (NL) .................................... 2010956

(51) Int. Cl.
| | |
|---|---|
| G05B 19/18 | (2006.01) |
| B25J 9/00 | (2006.01) |
| B25J 19/00 | (2006.01) |
| B25J 13/08 | (2006.01) |
| F16M 13/04 | (2006.01) |

(52) U.S. Cl.
CPC ............. *B25J 9/0006* (2013.01); *B25J 13/08* (2013.01); *B25J 19/0012* (2013.01); *F16M 13/04* (2013.01); *Y10S 901/02* (2013.01)

(58) Field of Classification Search
CPC combination set(s) only.
See application file for complete search history.

(56) References Cited

U.S. PATENT DOCUMENTS 5,845,540 A * 12/1998 Rosheim .................... B25J 3/04
414/4
6,301,526 B1 * 10/2001 Kim ....................... B25J 9/0006
600/1

(Continued)

FOREIGN PATENT DOCUMENTS

| KR | 1020120130975 | 12/2012 |
|---|---|---|
| WO | 2012/154580 | 11/2012 |
| WO | 2014/200343 | 12/2014 |

*Primary Examiner* — Bhavesh V Amin
(74) *Attorney, Agent, or Firm* — Peacock Law P.C.; Janeen Vilven (57) ABSTRACT

A device comprising a main body, an arm assembly comprising first arm member, a first joint, a second arm member, a second joint, orientation control means for adjusting the orientation of the arm members and/or joints of the arm assembly relative to the main body, one or more passive actuating means for counterbalancing at least a part of the weight of the arm assembly, wherein an adjustable lever mechanism is arranged between the main body and the arm assembly, drive means configured for adjusting the lever arm, one or more orientation sensors for determining the orientation of the arm members and/or joints of the arm assembly relative to the main body, and lever arm control means for adjusting the lever arm of the adjustable lever mechanism with the drive means. The invention further relates to a method of adjusting a lever arm of such a device.

17 Claims, 6 Drawing Sheets

(56) References Cited

U.S. PATENT DOCUMENTS

| | | | | |
|---|---|---|---|---|
| 6,539,333 B1* | 3/2003 | Metelski | ................ | F16M 11/18 |
| | | | | 702/173 |
| 7,553,266 B2* | 6/2009 | Abdoli-Eramaki | ..... | A61F 5/026 |
| | | | | 482/124 |
| 8,641,782 B2* | 2/2014 | Kim | ...................... | B25J 9/0006 |
| | | | | 414/5 |
| 9,205,017 B2* | 12/2015 | Doyle | .................. | A61H 1/0281 |
| 9,375,325 B2* | 6/2016 | Garrec | .................... | B25J 9/0006 |
| 9,427,865 B2* | 8/2016 | Doyle | .................... | F16M 13/04 |
| 2007/0080275 A1* | 4/2007 | Stachowski | .............. | A61B 8/00 |
| | | | | 248/323 |
| 2012/0184880 A1* | 7/2012 | Doyle | ................. | A61H 1/0281 |
| | | | | 601/33 |
| 2012/0330198 A1* | 12/2012 | Patoglu | ................. | B25J 9/0006 |
| | | | | 601/33 |
| 2016/0096268 A1* | 4/2016 | Genani | ............... | B25J 19/0012 |
| | | | | 700/245 |

* cited by examiner

DEVICE WITH IMPROVED ACTUATING MEANS AND METHOD FOR USE THEREOF

CROSS-REFERENCE TO RELATED APPLICATIONS

This application is a continuation application of Patent Cooperation Treaty Application No. PCT/NL2014/050380, filed on Jun. 11, 2014, which claims priority to Netherlands Patent Application No. 2010956, filed on Jun. 12, 2013, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)
The present invention relates to a wearable robot.
Description of Related Art
WO2012/154580 discloses a wearable robot or exoskeleton. Prior art (wearable) robots normally comprise active actuators for adjusting the orientation of the arm members and/or joints of the arm assembly relative to the main body. For this reason, these prior art robots have a relatively high energy consumption.

Although for all robots a low energy consumption is beneficial, this is especially true for wearable robots, also called exoskeletons. For exoskeletons, the high electricity consumption of current existing systems comprise a big disadvantage. A user of such an exoskeleton system either needs to carry the weight of a relatively large battery pack, or is limited in operational time due to required recharging of the battery pack.

BRIEF SUMMARY OF THE INVENTION

The present invention relates to a device, more particular a (wearable) robot,
  a main body; and
  an arm assembly, said arm assembly comprising:
    a first arm member;
    a first joint connecting the first arm member to the main body;
    a second arm member;
    a second joint connecting the second arm member to the first arm; and
    orientation control means for adjusting the orientation of the arm members and/or joints of the arm assembly relative to the main body.
An object of the present invention is to provide a device as mentioned above, that is improved relative to the prior art and wherein at least one of the above stated problems is obviated. Said object is achieved with the device, more particular a (wearable) robot, according to the present invention, said device comprising:
  a main body;
  an arm assembly, said arm assembly comprising:
    a first arm member;
    a first joint connecting the first arm member to the main body;
    a second arm member;
    a second joint connecting the second arm member to the first arm member; and
    orientation control means for adjusting the orientation of the arm members and/or of the joints of the arm assembly relative to the main body;
  one or more passive actuating means configured for counterbalancing at least a part of the weight of the arm assembly;
  wherein an adjustable lever mechanism is arranged between the main body and the arm assembly;
  drive means configured for adjusting the lever arm of the adjustable lever mechanism;
  one or more orientation sensors for determining the orientation of the arm members and/or of the joints of the arm assembly relative to the main body; and
  lever arm control means for adjusting the lever arm of the adjustable lever mechanism with the drive means, said adjustment being based on the orientation of the arm members and/or of the joints of the arm assembly determined by the one or more sensors.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Because the device according to the invention adjusts the lever arm of the adjustable lever mechanism, it allows passive actuating means to be used while the counterbalancing force can be varied within a desired range. In this way, active actuating means are obsolete, and the energy consumption of the device is therefore reduced compared to prior art systems with active actuating means.

Especially for exoskeletons, this means that a relatively small energy source in the form of a small battery pack is sufficient. The weight of the device can therefore be reduced, thereby improving user comfort of the exoskeleton user.

According to a preferred embodiment, the adjustable lever mechanism comprises an articulated system of bars. Such an articulated system of bars is very robust and almost maintenance free.

According to a further preferred embodiment, the adjustable lever mechanism comprises a bar mechanism. A bar mechanism on the one hand provides the required degrees of freedom, while on the other hand being relatively simple to adjust.

According to an even further preferred embodiment, said adjustable lever mechanism comprises:
- a first substantially rigid bar being formed by the main body;
- one extendable member; and
- one further bar that comprises a first pivot connection with the main body and a second pivot connection with the extendable member.

According to an even further preferred embodiment, said adjustable lever mechanism comprises:
- a first substantially rigid bar being formed by an arm member part of a first arm
- one extendable member; and
- one further bar that comprises a first pivot connection with the first arm member and a second pivot connection with the extendable member.

By having two adjustable lever mechanisms in one device, the degrees of freedom of the device is significantly improved.

According to an even further preferred embodiment, the pivot axis of the first pivot connection and the pivot axis of the second pivot connection are arranged substantially transverse with respect to each other. This allows the user to perform 3-dimensional movements.

According to an even further preferred embodiment, the extendable member is a passive actuator that comprises a spring. Springs are very reliable actuating means that can moreover be made adjustable in a very simple way.

According to an even further preferred embodiment, the passive actuator comprises a gas spring. Gas springs can provide a high force in a compact package, and the force curve is almost constant. Moreover, this force curve can be customized for the desired application, reducing the complexity of the (exoskeleton) design.

According to an alternative embodiment, the extendable member comprises a pneumatic member or elastic member. Pneumatic artificial muscles, also known as McKibben artificial muscles, provide a preferred embodiment. Pneumatic artificial muscles (PAMs) are contractile or extensional devices operated by pressurized air filling a pneumatic bladder. By inflating the elastic artificial muscles, the stiffness thereof is adaptable.

According to an even further preferred embodiment, the one or more orientation sensors at least comprise a sensor arranged at or near the second joint that connects the second arm member to the first arm member.

According to an even further preferred embodiment, the device further comprises a weight sensor configured for determining the weight of an object and/or appendage, such a tool, when it is attached to or carried by the arm assembly. By measuring this weight, it is possible to further improve the adjustment of the lever arm of the adjustable lever mechanism.

According to an even further preferred embodiment, the drive means configured for adjusting the lever arm of the adjustable lever mechanism comprise a screw and motor assembly that is configured for adjusting a connection point of one of the bars of the articulated system of bars of the adjustable lever mechanism. A screw and motor assembly is a robust and reliable mechanism, that is moreover suitable for relatively high forces when the screw thread has a suitable pitch.

According to an alternative embodiment, the pretension of the spring is adjustable.

According to an even further preferred embodiment, the device is a wearable robot, more particularly an exoskeleton.

According to an even further preferred embodiment, the main body of the device is a frame that can be worn by a user of the device.

According to an even further preferred embodiment, the weight of the device is distributed along the back and hips, and is mainly supported by the hips of the user.

According to an even further preferred embodiment, the pivot axes are configured to substantially coincide with the pivot axes of the biological joints of the user when the device is worn by the user.

According to an even further preferred embodiment, the length of the arm members of the arm assembly is adjustable, so that it can be adapted to the user's body.

The invention is further related to a method of adjusting a lever arm of a device as described above, said method comprising the steps of:
- determining the orientation of the arm members and/or joints of the arm assembly relative to the main body by one or more orientation sensors; and
- adjusting the lever arm of the adjustable lever mechanism with the drive means, said adjustment being based on the orientation of the arm members and/or joints of the arm assembly determined by the one or more sensors.

Figure 1:
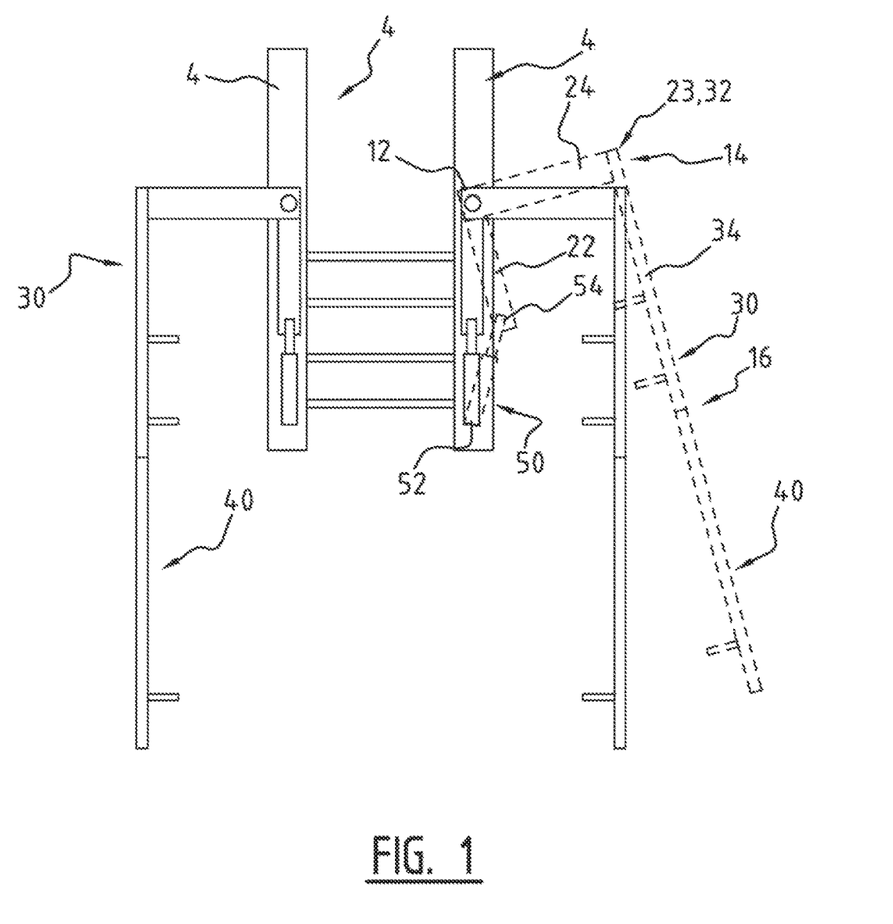
FIG. 1 is a schematic rear view of an exoskeleton device according to the present invention.
Figure 2:
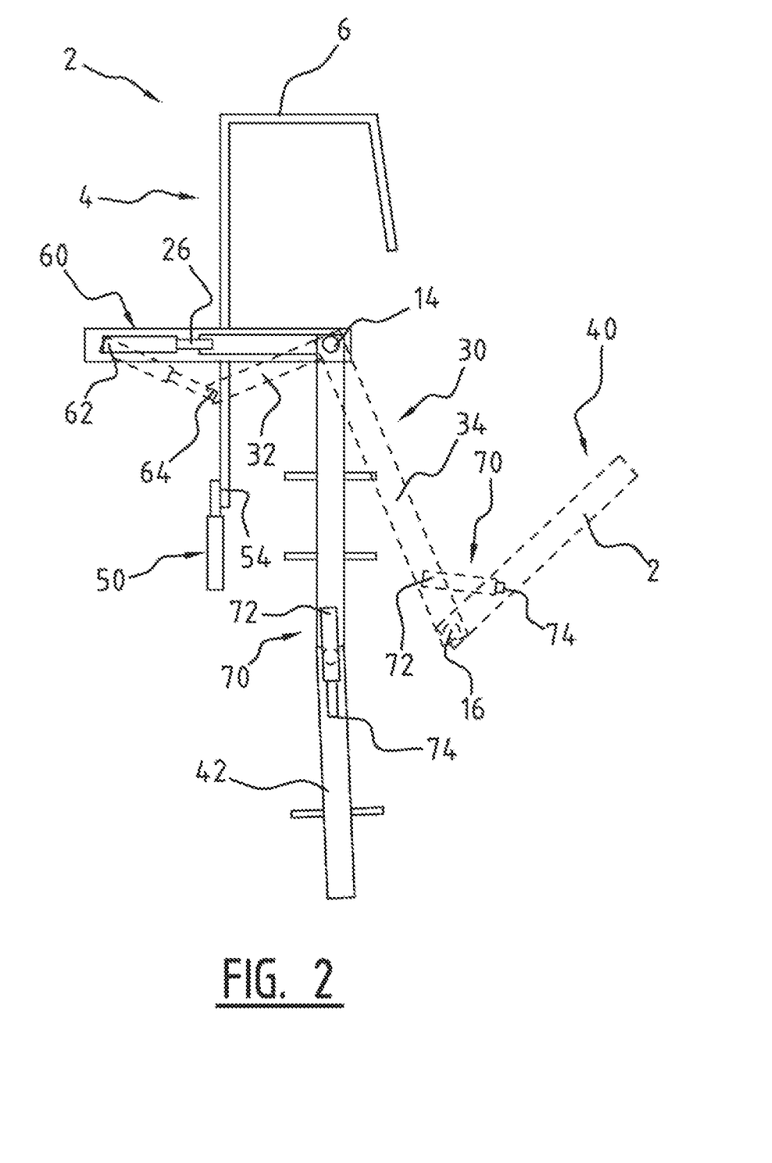
FIG. 2 is a schematic side view of the exoskeleton device of FIG. 1.
Figure 3:
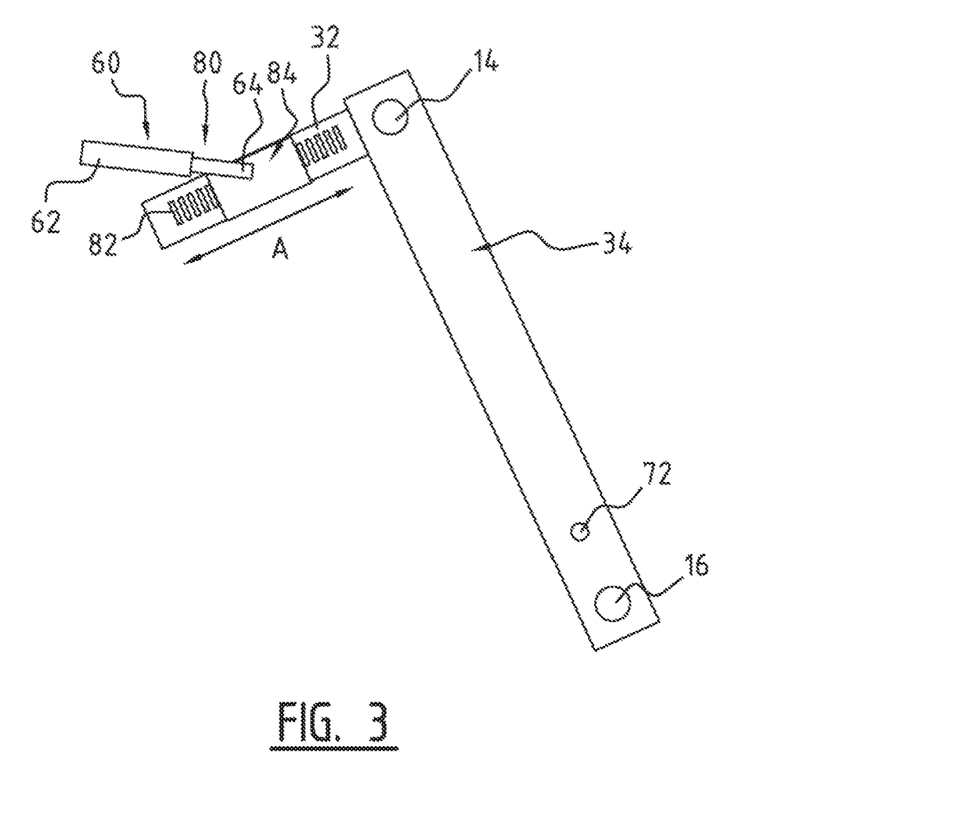
FIG. 3 is a schematic view of an adjustable lever mechanism of the exoskeleton device of FIGS. 1 and 2.
Figure 4:
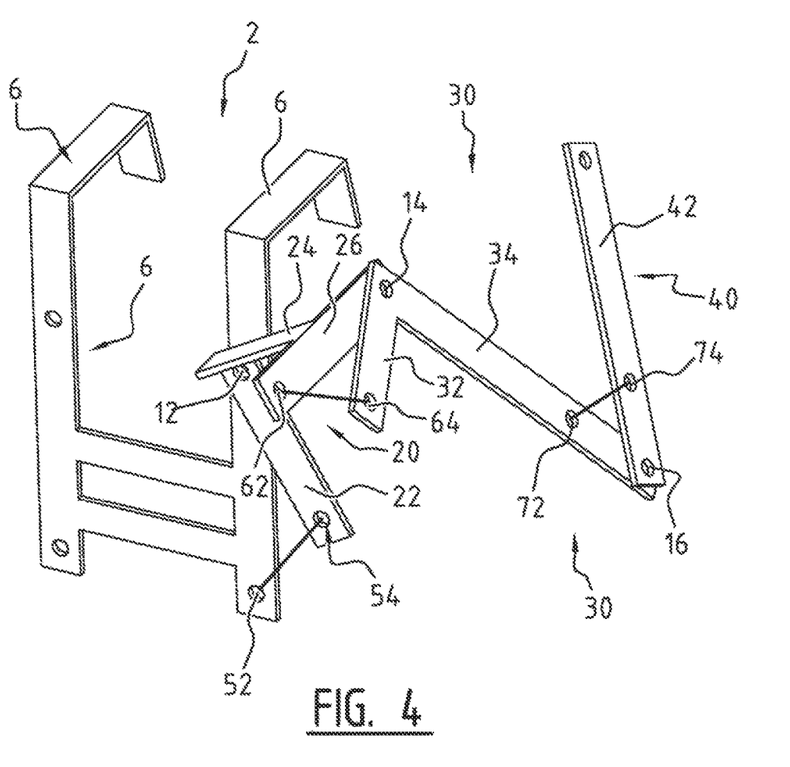
FIGS. 4 and 5 are perspective views of the exoskeleton device of FIGS. 1-3.
Figure 5:
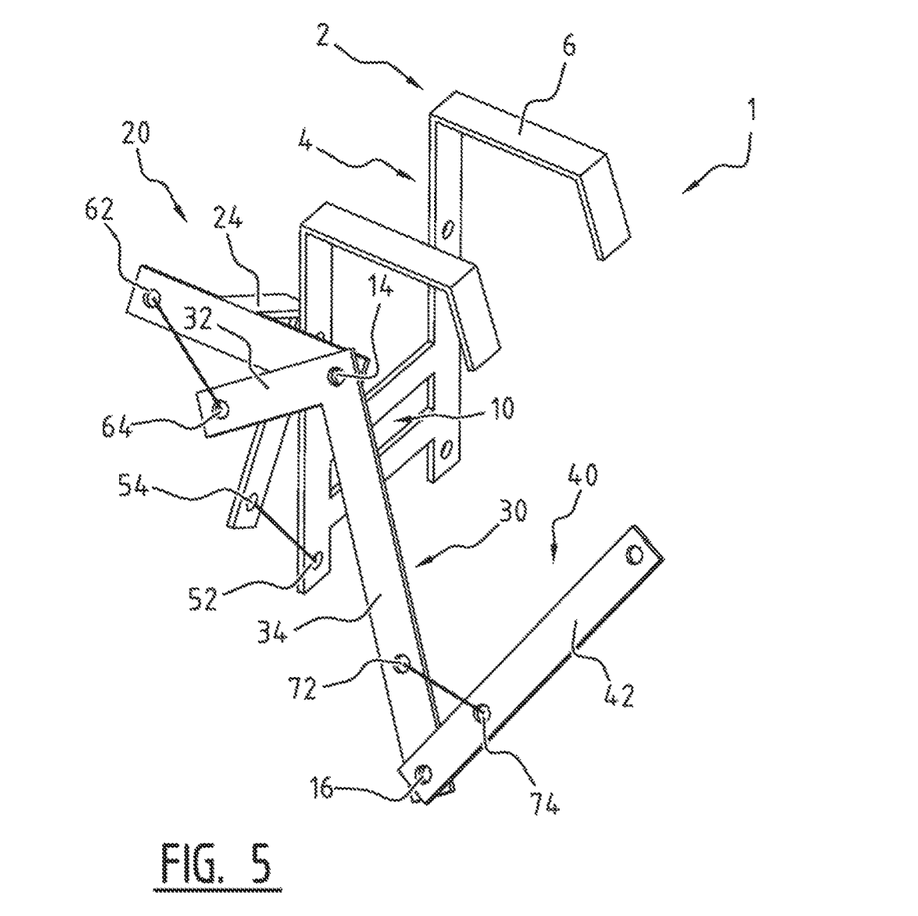

In the following description preferred embodiments of the present invention are further elucidated with reference to the drawing, in which:

FIG. 1 is a schematic rear view of an exoskeleton device according to the present invention;

FIG. 2 is a schematic side view of the exoskeleton device of FIG. 1;

FIG. 3 is a schematic view of an adjustable lever mechanism of the exoskeleton device of FIGS. 1 and 2;

FIGS. 4 and 5 are perspective views of the exoskeleton device of FIGS. 1-3; and

Figure 6:
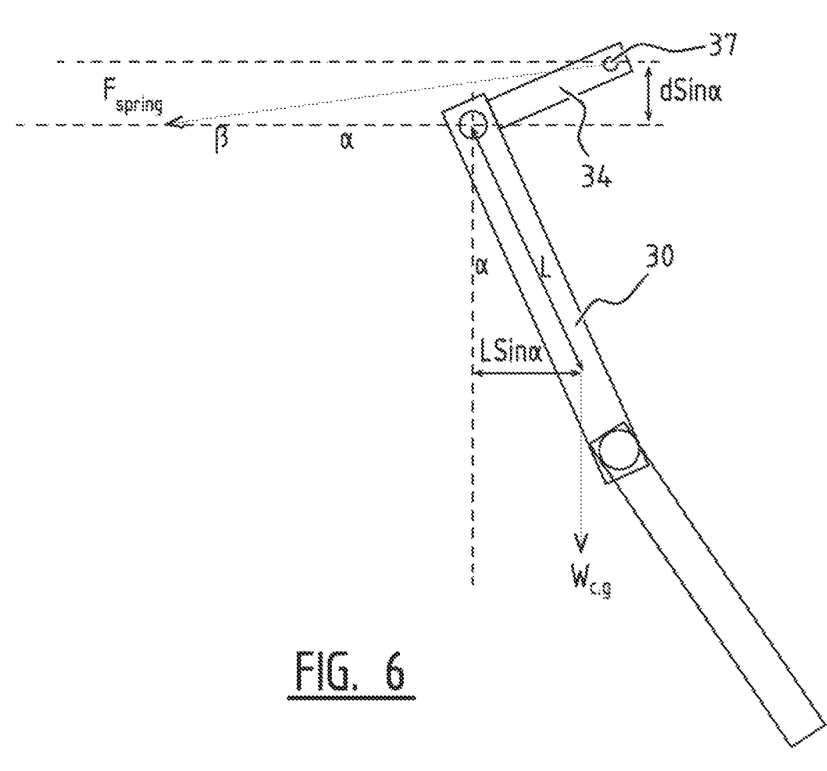
FIG. 6 is a schematic overview showing the principle of the exoskeleton device according to the invention.

FIG. 6 is a schematic overview showing the principle of the exoskeleton device according to the invention.

The invention is now described by illustrating the principle on a compact upper body exoskeleton, but it will be appreciated that the invention is not limited to upper body exoskeletons, nor to exoskeletons in general.

The compact upper body exoskeleton can be worn by a user using the stationary frame 2 that functions as a main body, which may rest with shoulder rests 6 on the shoulder of the user.

The frame 2 can also be integrated in an upper body suit, as a result of which forces can be distributed more evenly across the upper body and the device can be more stably mounted. Preferably, part of the weight of the upper body exoskeleton is supported by the hips of the user.

The rear view shown in FIG. 1 shows the part of the system that allows the user to perform a shoulder flexion-extension movement, i.e. moving the arm forward-rearward.

The side view of FIG. 2 shows the part of the system that allows the user to perform a shoulder abduction-adduction movement, i.e. moving the arm up and down.

FIGS. 4 and 5 are perspective views of the exoskeleton device, that show how the system parts shown in FIGS. 1 and 2 combine. For sake of clarity, the passive actuators 50, 60, 70 are not shown in FIGS. 4 and 5.

The main body 2 comprises a back frame and shoulder rests 6. The back frame 4 comprises a first pivot point 12 that pivotably connects a first arm member 20 of an arm assembly to the main body 2 formed by the frame.

The arm assembly 10 further comprises a second arm member 30 and a second pivot point 14 connecting the second arm member 30 to the first arm member 20.

The orientation of the arm members 20, 30 and/or of the pivot points 12, 14 that form the joints of the arm assembly 10 can be adjusted by (not shown) drive means that are controlled by (also not shown) orientation control means.

The first arm member 20 comprises a first part 22, a second part 24 and a third part 26. Together with the main body 2 they form an adjustable lever mechanism that comprises an articulated system of bars.

A first substantially rigid bar is being formed by the main body 2, while a passive actuator in the form of a gas spring 50 forms an extendable member 50. The adjustable lever mechanism comprises one further bar 22 that comprises a first pivot connection 12 with the main body 2 and a second pivot connection 54 with the extendable member 50.

By adjusting one or more of the attachment points of the gas spring 50 that forms the extendable member of the adjustable lever mechanism, the lever arm of the adjustable lever mechanism is adjusted.

Suitable drive means 80 for adjusting the lever arm of the adjustable lever mechanism are shown in FIG. 3 in relation to the part of the system that is best shown in FIG. 2, i.e. the part of the system that allows the user to perform a shoulder abduction-adduction movement (moving the arm up and down). They comprise of a screw 82 and thread assembly over which a motorized member 84 with internal screw thread is mounted. By turning the motor, it will drive along screw 82 and in this way adjust the second attachment point 64 of the gas spring 60.

The same principle can be applied for the other gas springs 50, 70 of further adjustable lever mechanisms of the device according to the invention.

By adjusting the adjustable lever mechanisms of the device 1, the present invention allows passive actuators 50, 60, 70 such as the gas springs to be applied in a range of desired. The gas springs 50, 60, 70 are passive actuating means configured for counterbalancing at least a part of the weight of the arm assembly.

In order to achieve the desired counterbalancing with the one or more adjustable lever mechanisms of the device, the device comprises one or more (not shown) orientation sensors for determining the orientation of the arm members and/or of the joints of the arm assembly 10 relative to the main body 2, and (not shown) lever arm control means for adjusting the lever arm of the adjustable lever mechanism with drive means 80. The adjustment is based on the orientation of the arm members 20, 30, 40 and/or of the joints 12, 14, 16 of the arm assembly 10 determined by the one or more sensors.

By using the orientations determined by the one or more orientation sensors, the control means for adjusting the lever arm of the adjustable lever mechanism approximate the amount of weight compensation against gravity. This is mostly due to the fact that the center of gravity of the arm assembly 10 changes as third pivot point 16, i.e. the elbow of a user, rotates in flexion. For a number of applications that require the arm to be steadily positioned in front of a user, with limited flexion of the elbow, this simple construction should suffice. However, for applications requiring a higher control over the amount of force compensation against gravity, such as those requiring complex movement of arms or applications involving maneuvering very heavy tools or objects, a (not shown) first sensor that calculates the position of the elbow joint 16 and a (not shown) second sensor that calculates the load of the object being handled can be used.

The data collected from the sensors can be used to drive a motor 84, which slides on a screw 82. The passive actuator 60 is mounted on the motor 84. As the motor drives back and forth on the screw 82, torque required for turning the arm can be adjusted depending on the data received from the sensors. The control unit can be mounted at main body 2 and the system can be programmed to perform optimally for a specific operation.

In this way, the present invention overcomes a major limitation of existing wearable exoskeletons i.e. power required. Most exoskeletons require re-charging after a few hours of use as they rely solely on electric motors for producing torque. Since passive actuators 50, 60, 70 provides the force and electricity is only being used for fine tuning the torque, the device according to the invention only requires a very limited power consumption. In this way, the running time for exoskeletons can be increased, and/or smaller battery packs can be used in order to improve user comfort.

Moreover, a compact exoskeleton system that uses the principle of weight/torque balancing also has the added advantage that the user only has to supply minimum amount of force to get the system to move as per his will making it highly intuitive. It eliminates the need for highly complex bionic systems that are being developed for able bodied individuals who have all their limbs in working condition. It is also an improvement over using switches and buttons to control the actuators which is a common approach in the prior art.

A number of straps can be attached to arm parts 34, 42 of arm members 30 and 40 that allow the arm to be attached to the compact upper body exoskeleton. Straps or fabric can also be used to fasten the arm to the compact upper body exoskeleton, or other parts of any of the arm members 20, 30 and 40.

FIG. 6 shows the basic principle of the exoskeleton device according to the present invention. In the second part of the second arm member 34, the (not shown) adjustable lever according to the invention is incorporated.

Although they show preferred embodiments of the invention, the above described embodiments are intended only to illustrate the invention and not to limit in any way the scope of the invention. Accordingly, it should be understood that where features mentioned in the appended claims are followed by reference signs, such signs are included solely for the purpose of enhancing the intelligibility of the claims and are in no way limiting on the scope of the claims. Furthermore, it is particularly noted that the skilled person can combine technical measures of the different embodiments. The scope of the invention is therefore defined solely by the following claims.

What is claimed is:

1. A wearable robot, comprising:
   a main body;
   an arm assembly with arm members and joints connectable to
     an orientation controller configured for adjusting the orientation of the arm members and/or of the joints of the arm assembly relative to the main body;
   one or more passive actuators configured for providing a counterbalancing force that counterbalances at least a part of the weight of the arm assembly;
   an adjustable lever mechanism arranged between the main body and the arm assembly;
   a driver motor configured for adjusting the lever arm of the adjustable lever mechanism;
   one or more orientation sensors configured for determining the orientation of the arm members and/or of the joints of the arm assembly relative to the main body; and
   a lever arm controller configured to fine-tune the counterbalancing force by adjusting the lever arm of the adjustable lever mechanism with the drive motor, said adjustment being based on the orientation of the arm members and/or of the joints of the arm assembly determined by the one or more sensors.

2. The wearable robot according to claim 1, wherein the adjustable lever mechanism comprises an articulated system of bars.

3. The wearable robot according to claim 1, wherein said adjustable lever mechanism comprises:
   a first substantially rigid bar being formed by the main body;
   one extendable member; and
   one further bar that comprises a first pivot connection with the main body and a second pivot connection with the extendable member.

4. The wearable robot according to claim 1, wherein said adjustable lever mechanism comprises:
   a first substantially rigid bar being formed by an arm member part of a first arm;
   one extendable member; and
   one further bar that comprises a first pivot connection with the first arm member and a second pivot connection with the extendable member.

5. The wearable robot according to claim 4, wherein the pivot axis of the first pivot connection and the pivot axis of the second pivot connection are arranged substantially transverse with respect to each other.

6. The wearable robot according to claim 1, wherein the extendable member is a passive actuator that comprises a spring.

7. The wearable robot according to claim 1, wherein the passive actuator comprises a gas spring.

8. The wearable robot according to claim 1, wherein the extendable member comprises an elastic member.

9. The wearable robot according to claim 8, wherein the elastic member is a pneumatic artificial muscle.

10. The wearable robot according to claim 1, wherein the one or more orientation sensors at least comprise a sensor arranged at or near the second joint that connects the second arm member to the first arm member.

11. The wearable robot according to claim 1, further comprising a weight sensor configured for determining the weight of an object and/or appendage, such a tool, when it is attached to or carried by the arm assembly.

12. The wearable robot according to claim 1, wherein the driver configured for adjusting the lever arm of the adjustable lever mechanism comprise a screw and motor assembly that is configured for adjusting a connection point of one of the bars of the articulated system of bars of the adjustable lever mechanism.

13. The wearable robot according to claim 1, wherein the wearable robot is an exoskeleton.

14. The wearable robot according to claim 1, wherein the main body of the robot is a frame that can be worn by a user of the device.

15. The wearable robot according to claim 14, wherein the weight of the robot is distributed along the back and hips, and is plainly supported by the hips of the user.

16. The wearable robot according to claim 14, wherein the pivot axes are configured to substantially coincide with the pivot axes of the biological joints of the user when the device is worn by the user.

17. A wearable robot, comprising:
   a main body;
   an arm assembly having a center of gravity which is rotatable relative to the main body around a pivot point; and
   one or more springs configured for providing a counter balancing force which counterbalances at least a part of the weight of the arm assembly, said counter balancing force being a sinusoidal action of the angle between a straight line through the center of gravity of the arm assembly and the pivot point and a vertical plane through the pivot point, with a minimum when the angle is zero.

* * * * *

UNITED STATES PATENT AND TRADEMARK OFFICE
CERTIFICATE OF CORRECTION

PATENT NO. : 10,071,476 B2
APPLICATION NO. : 14/966778
DATED : September 11, 2018
INVENTOR(S) : Gaurav Genani Page 1 of 1

It is certified that error appears in the above-identified patent and that said Letters Patent is hereby corrected as shown below:

In the Claims

Column 8, Line 31 is replaced as shown:
and is mainly supported by the hips of the user.

Signed and Sealed this
Twenty-third Day of October, 2018

Andrei Iancu
*Director of the United States Patent and Trademark Office*